J. POINTU.
MULTICOLOR LOOM.
APPLICATION FILED MAY 31, 1912.

1,147,186.

Patented July 20, 1915.
7 SHEETS—SHEET 4.

J. POINTU.
MULTICOLOR LOOM.
APPLICATION FILED MAY 31, 1912.

1,147,186.

Patented July 20, 1915.
7 SHEETS—SHEET 7.

UNITED STATES PATENT OFFICE.

JEAN POINTU, OF ROANNE, FRANCE.

MULTICOLOR-LOOM.

1,147,186.  Specification of Letters Patent.  Patented July 20, 1915.

Application filed May 31, 1912. Serial No. 700,710.

*To all whom it may concern:*

Be it known that I, JEAN POINTU, designer of textiles, of 10 Place Victor Hugo, Roanne, Loire, in the Republic of France, have invented new and useful Improvements in Multicolor-Looms, of which the following is a specification.

My invention relates to multi-color looms and has for its object the automatic changing of the shuttles with their pirns, or the pirns alone (Northrop type), when the thread is nearly exhausted, irrespective of the color of the thread and without stopping the loom.

Briefly put, in my invention there are two shuttle boxes, each with several compartments, one of the boxes being either of the rising or revolving type and the other being of the revolving type. The former, which carries shuttles with differently colored weft in its compartments, is controlled by the card mechanism, and by its movement determines which shuttle is picked. As a rising box is used in the form of the invention subsequently described, I will refer herein to the box for performing this function by this name, although a revolving one could be used. The latter, during the normal course of weaving receives the shuttles in the same compartment, from which of course they are repicked; it only changes the compartment it presents to the picked shuttle when the weft in the last one received is exhausted. The exhausted shuttle is retained in the compartment it has entered, but is placed out of action by the rotation of the box, a new compartment already charged with a full shuttle having weft of the same color as that put out of action, being presented to the picker. The spent shuttle is ejected from its compartment later on, when another replacement of shuttles is being made.

According to my invention, I use the card mechanism not only for its main purpose as above mentioned, but also in connection with the replacement of a shuttle. Broadly speaking, this has already been done.

The characteristic of my invention is this however; the setting in action of the shuttle changing mechanism is determined by a card behind the one simultaneously presented to the mechanism controlling the rising box, that is to say, the one determining the color of the weft to be picked.

The weft exhaustion indicator on a shuttle is operated when the shuttle is in the rising box, but cannot produce any effect on the shuttle changing mechanism until permitted to do so by the card control. The card prism moves so that a fresh card is presented to the mechanism controlling the rising box after an interval during which the batten has executed two to-and-fro movements or picks (in reverse directions), and since it is a card behind this one which allows the indicating mechanism to become effective, it follows that the first stages of the shuttle changing operations can be commenced at least two picks before the almost spent shuttle is picked from the rising to the revolving box. Obviously, from the preceding description, it will be seen that these operations can be commenced four or more picks previously. The consequence of this is, that operations can be distributed over several picks, and during the last pick, prior to the replacement of the shuttle, only a few operations at the most have to be performed. Thus, when the moment comes for the actual changing of the shuttle, everything has been gradually got ready in advance, and the change is effected without any abnormal effort on the part of any member of the mechanism.

In the description which follows, and on the drawings, one way of carrying out the invention is set forth in which the selection and changing of the shuttles with their pirns is operated electrically. A loom has been chosen working with four colors, having rising and revolving boxes, each box with four compartments, at opposite extremities of the batten or going part; these compartments are provided with the necessary shuttle box swells to secure the shuttles.

In the accompanying drawings: Fig. 6ª is an end view of a shuttle.

In the form of the invention shown, shuttles are employed of the kind patented by me in my English patent, No. 4629 of 1910; this kind of shuttle is adapted to permit of the passage of an electrical current through itself, when thread of the shuttle is nearly exhausted, by the movement of a spring button (not shown) which makes contact with the contact plate 25 (Fig. 6) on one side of the shuttle 26.

Throughout the separate views the same part is designated by the same reference character.

Figure 1:
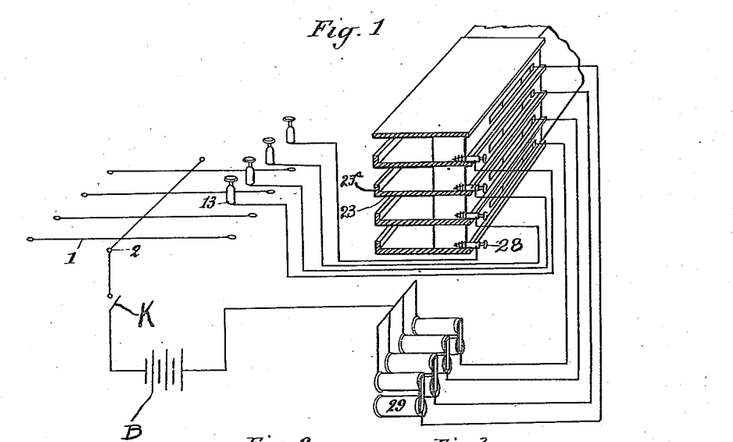
Figure 1 shows the diagram of electrical connections for the different members.

Referring more particularly to the drawings, the electrical connections can be easily traced; there are a number of compartments in the rising box A (Fig. 6), a like number of shuttles 26 and a circuit for each shuttle, each circuit comprising an electro-magnet 29, a circuit breaker or interrupter formed by one of a number of levers 1 turning on an axis 2 (common to all of the levers), and leads connected as follows: From a source of current B, a lead runs to the electro-magnet, thence leads pass to terminals 24 (Figs. 1 and 5), thence via 20, each circuit connects to a swell 19, and so to a plate 25 on a shuttle 26 and through the shuttle to the opposite plate 27, (these connections are only established of course when the shuttle is in its compartment, and has nearly spent all its weft). From 27 each circuit extends via a lip 23$^a$ and a ledge 23 to a terminal 28. It may be remarked that, except for the plates 25 and 27, the surface of the shuttle in contact with 23 is non-conducting, and further, that the plate 25 is insulated, as clearly shown from the adjacent portion of the ledge 23. From the terminals 28, (Fig. 1), each circuit is carried to terminals 13, then, at certain intervals, through one or other of the levers 1 to the axis 2, and thus through a key K (when closed) to the source B. The key K is an interrupting device and normally stands open. When the batten is at the extreme end of its stroke, the batten support strikes the head D and closes the key, which is suitably inclosed to prevent damage by sparks. It will be seen that the interrupter key K aforementioned, is controlled in such a manner that the current, in order to avoid any loss, passes only when the batten presses the weft.

Figure 2:
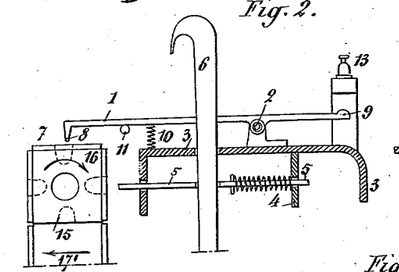
Fig. 2 is a side view of the shuttle selector fixed on the right side of the loom, the driving mechanism being to the left.
Figure 3:
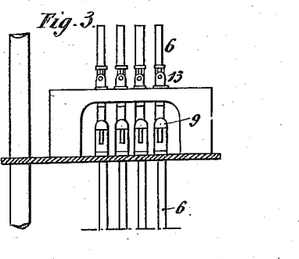
Fig. 3 is a front view of the selector shown in Fig. 2.

In Fig. 2, which shows the shuttle selector, 1 is one of the levers aforesaid which oscillates about the spindle 2, fixed on a housing 3 of the box 4 for the needles 5 of the lifting wires 6 which control the rising box. The needles 5 are adapted to enter the holes in the card 7 on the jacquard cylinder 15, when they are opposite to them, and the corresponding lifting wire 6 is then raised and produces the usual result, the cylinder being rotatably mounted on the shaft 17$^a$.

Figure 4:
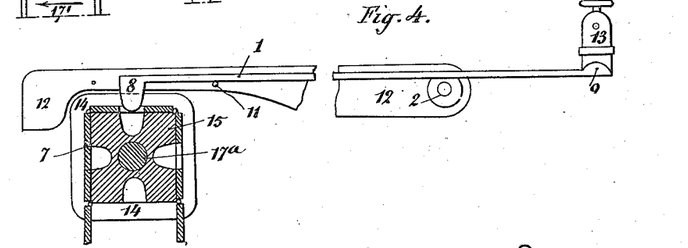
Fig. 4 is a view on an enlarged scale of the principal members of Fig. 2.

It will be understood that when the needle presses against the card 7, the hole provided in the card allows the needle to enter and then frees the lifting wire 6 above the blade which raises this lifting wire and brings in front of the batten the division of the rising and falling shuttle box corresponding to this lifting wire and to this needle so as to make the necessary selection. There are as many needles 5, lifting wires 6, and selecting levers 1 as there are shuttles of different colors. The case is the same as regards the number of divisions of the shuttle box. These needles, lifting wires, and selecting levers are independent of each other and the same needle always operates with the same lifting wire, the same selecting lever always operates with the same electromagnet 29, and the same needle and selecting lever always act with the same division of the shuttle box. The selecting levers 1 rest on the upper card which corresponds to the color of the shuttles which are being or are next to be operated, for each principal pattern card is formed of several perforated cards or bands, hinged to and connected to each other, perforated with a hole corresponding to the color to be sent to the batten in order to make the required pattern, while the needles 5 strike the card corresponding to the shuttle which is operating. These two cards are perforated with holes corresponding to the same color or to different colors according to the colors used in the pattern. Take, for example, a pattern of 20-blue, 4-white, 4-light blue, and any other selected color. If the needle 5 strikes the first card of 20-blue, the selecting levers rest on the succeeding card and one of them penetrates a hole which corresponds to the same hole as the needle 5, there being no change in color necessary at this point of the pattern. Each perforated card or band represents two beats of the batten, that is, the forward and backward movement of the same shuttle. However, if the needles strike the 10th band of the blue, the selecting levers rest on the card in which is perforated a hole corresponding to the division of the rising shuttle box containing the shuttle with white thread and the corresponding lever penetrates into the perforation. In either case the lever operates if the corresponding shuttle of white thread is finished, that is, if the circuit has already been closed on its two faces. If this is the case, at the moment when the batten beats the cloth, the current, the circuit being closed by the shuttle, second by one of the selecting levers at 9, and fed by the interrupting device or key K, passes through the corresponding electromagnet and attracts the lever 30, which determines all the movements of the charging mechanism. The key being closed on the forward beat of the lay and the gap between corresponding contact 24 and 26 being closed by the exhausted shuttle, one of the magnets 29 is energized lifting the proper arm 37, which, as the lay swings back, moves the magazine into position to deliver a shuttle with weft of the color corresponding to the next shuttle to be used. The active shuttle is thrown back to the shifting shuttle box, the second card indicates the proper needle 5, the exhausted shuttle is brought to the level of the race lay and so returns to the magazine side of the loom. In the next forward beat of the lay a shuttle with weft, corresponding to that in the compartment of the revolving box is inserted in the forward compartment (Fig. 25) and on the rearward movement of the lay the revolving box is turned so as to bring the full shuttle to the top and to the level of the race lay. The replenishing is now complete and the full shuttle will be thrown across to the proper compartment of the shifting shuttle box. In the contrary case, everything remains unaffected. It will be seen that jacquard cylinder 15 of the above described mechanism is mounted on a shaft 17, which is rotated in a step by step manner by any convenient known mechanism (not shown). The cylinder 15 is shown as four square in cross section (see Fig. 4) so as to accommodate the card 7 on three sides. In order that the different movements of withdrawal of the empty shuttle, of the descent of the corresponding shuttle onto the charging slide, and of placing the latter in the revolving box, shall be spread out over several beats of the batten, it is indispensable that there should not be a controlling relation between the selecting levers and the shuttles of the rising and falling box and the current of the shuttle which is operated. If the selecting levers were done away with, it would be necessary that all these movements should take place in a single beat of the batten, that is, that the exhausted shuttle leaving one compartment of the rising box should arrive at the other side of the loom, and that all the charging movements would be finished so that the change could take place. This would be impossible to obtain.

It will be understood that the shuttle box mechanism employed is similar to that commonly utilized and which is, for example, described in the United States patent to Baker and Kip, 655,643, dated August 7, 1900.

The prism 15 as shown in Fig. 2, of course turns through a quarter turn in the direction indicated for each alternate complete swing of the batten or pick; thus when the lever 1 is actuated by a card, it will take place two swings of the batten before the said card can actuate the needle 5. The levers 1 carry at their extremities two buttons 8 and 9. The left hand end (Fig. 2) of each lever is pulled downward by a spring 10 suitably fixed to the frame. An oscillatory movement is imparted to the levers by any suitable arrangement such as that which could be obtained by the action of a stop 11 fixed on an arm 12 that oscillates freely about the spindle 2. The stop 11 passes under the levers 1 and raises them all together against the action of the springs 10; in its oscillation it falls through such a distance that it allows the levers 1 to be pulled down by the springs 10 to a height sufficient to permit that one whose button 8 is opposite a hole in the then horizontal card 7 to enter this hole to a sufficient depth to enable the other button 9 to come in contact with its corresponding terminal 13 which is suitably insulated. The oscillatory movement of the lever 12 itself is given for example by means of a cam 14 with rounded corners fixed on the axis of the card cylinder (a known mechanism). When the cylinder 15 moves bodily in the direction of the arrow 17' (Fig. 2) it also turns in the direction of the arrow 16, a movement that is produced by all the known systems of ratchets and pawls for rotating this cylinder. The member 14 raises the lever 12, and the pin 11 raises all of the levers 1. The quarter turn accomplished, 12 is lowered and with it the levers 1.

Figure 5:
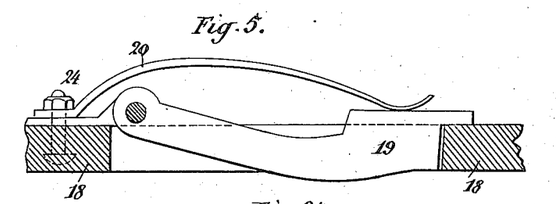
Fig. 5 is a horizontal section of a swell in one of the boxes.
Figures 7, 8, 9:
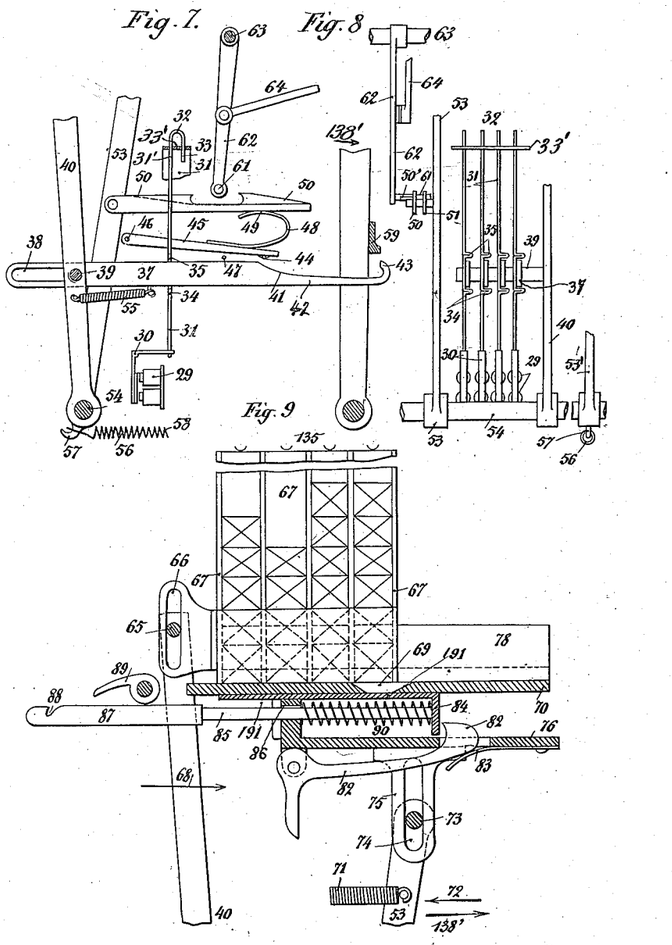
Fig. 7 is a side view of the lower part of the members of the distributing mechanism for replacing the empty shuttles by full ones.
Fig. 8 is a front view of these members.
Fig. 9 is a side view, partly in section, of the upper part of these members, and also of the shuttle supply magazine, the magazine being provided with a suitable number of shuttles for each compartment of the shuttle box, each set of shuttles having threads of the requisite color.

Fig. 5 shows a horizontal section of a swell for the shuttle. 18 is the frame of the shuttle box formed by a piece of wood hollowed out to receive the swell. The use of wood permits of the insulation of the several boxes from one another. The metallic swell 19 is pressed upon by its spring 20 which is put into electrical communication with the circuit by a bolt and nut 24, whose head is sunk in the wood 18. The frames of the compartments of the rising box are formed by the wooden pieces 18 and metallic pieces 22 and 23, the latter forming a series of ledges to support the shuttles. Lips 23ª are formed at the extremities of the ledges 23; these ledges 23 themselves like the top 22, do not make electrical contact with the shuttle, since only the insulating faces of the latter touch them. There are as many magnets 29 as there are levers 1 corresponding to each of the compartments of the rising box. The current passing through one of these electromagnets 29 attracts one of the branches of the corresponding bent lever 30, (Fig. 7—), whose other branch raises a corresponding needle 31. These needles are prevented from turning about themselves by a suitable device such, for example, as by the formation of a crook 32, the parts 31' and 33 of which slide in a piece 33' fixed to the framework. These needles 31 have two loops 35 and 36 between which pass arms 37 having slots 38 in which rides a pin 39 fixed on an arm 40. Means subsequently to be described, are provided for engaging and moving any one of these arms horizontally (Fig. 7). The one that is moved will then itself actuate the arm 40: the slots 38 are of different lengths, so that the arm 40 will be moved to a greater or less extent according to which arm 37 is moved, and it will by this means determine the selection of a shuttle having the thread of the requisite color in a manner described later on. The other extremities of the arms 37 are narrowed as shown, the narrowed portions comprising an inclined part 41, a straight part 42 and a hooked end 43. When one of the levers 37 has been raised by the previously described mechanism, a member 44 extending laterally across the arms 37 and fixed on an arm 45, is brought to slide on the inclined edge 41; said arm can turn about its spindle 46 which is fixed on the frame to which is also fixed a stop 47 which limits the fall of 45. On 45 is also fixed a flat spring 48 supporting by its branches 49, two blades 50 and 51 which are fixed on the arm 53. The arm 53 and another arm 53' (Fig. 8) are fixed on a shaft 54 which turns in bearings secured to the frame. The arm 40 oscillates upon said shaft 54. The arms 37 are drawn toward arm 40 by suitable means such as spiral springs 55. The arm 53' is always drawn to its position of rest by suitable means such as a spring 56, one end of which is attached to a hook 57 projecting from 53' and the other to the framework at a point 56. The hook 43 of the arm 37 which has been raised by the passage of the current in the corresponding electromagnet 29, engages with an angle block 59 arranged on the batten 60. The corresponding arm 37 is actuated and through it the arm 40 to a degree depending on the length of the slot 38. For each arm 37 there is a well determined position of the arm 40. In the ascending movement of the arm 37, the inclined edge is in contact with the pin 44, said pin being therefore raised during the forward movement of said arm and with it, the lever 45, the branch 49 of the spring 48, and the two blades 50 and 51. On its forward movement, the arm 37 actuates the arm 40 which controls the corresponding position of the shuttle supply magazine of which mention has already been made.

Between the confronting notches of the levers 50 and 51, a pin 61 (Figs. 7 and 8) oscillates, said pin being carried by a lever 62 oscillating on a fixed rod 63. To this lever a link 64 imparts a to-and-fro movement in the opposite direction to that of the batten. The upper extremity of 40 carries a roller 65 which slides in a slot 66 formed in a plate fixed in front of the lower part of the shuttle supply magazine 67. This magazine can slide between guides and on a base fixed to the framework. It is divided up into vertical compartments equal in number to the different colors of thread employed. The upper part of this magazine carries above each compartment pieces 135 of slightly open U-shape to which are attached the free ends of the threads of each pirn. When a shuttle has been passed into the batten, and so put into use, the thread will be cut near the selvage of the fabric by shears of any suitable kind. The movement of the magazine 67 is such that, the color of thread required to be replenished having been indicated by the mechanism previously described, the requisite shuttle is set automatically into the batten by the following movements. The lever 40 leaving its position of rest is moved in the direction of the arrow 68 (Fig. 9) by that one of the arms 37 (Figs. 7 and 8) which corresponds to the shuttle to be changed. In this movement the roller 65 riding in the slot 66 (Fig. 9) leads the corresponding compartment of the magazine over an opening 69 formed in the plate 70 fixed to the frame.

By the movement of arms 53 and 53′ in the direction of the arrow 72 (Fig. 9) a roller 73 carried by arms 53 and 53′ and riding in the slot 74 formed in a piece 75 fixed to the slide 76, moves this slide which itself moves the pins 77 fixed to each of the guides 78 (Figs. 9, 10, 11 and 12) situated on either side of the stationary plate 70.

The guides 78 (Figs. 10, 11, 12 and 13) carry three ledges 79, 80, and 81 (Figs. 10 and 13) which are devised to guide the shuttles in their movement, and to allow to depart from the magazine only that shuttle which ought to be sent into the batten. The two operations of selection and delivery of the shuttle occur one after the other.

The position and the length of the ledge 80 are such that it retains by its upper part the shuttle situated above that which is delivered through the opening 69. The function of the ledges 79 and 81 is to guide the shuttles and also to support them by their steel points; the wear due to this arrangement is much less important than that which would be produced by the sliding of the wooden parts of the shuttles on the plates 70. The object of their movement is to bring the gaps between the ledges 79 and 81, over the opening 69 in the fixed plate 70. The object of the movement of the magazine 67, as already explained, is to bring the requisite shuttle column also above said opening 69, whereby, as will be seen, one shuttle (and only one) has a free passage opened for it, down onto the plate 191. It will be understood that the ledges 79, 80 and 81 are free to pass between or beneath the tapered points of the shuttles, consequently the guides 78 when moved, are free to move relatively to the shuttle magazine and also of course to the stationary plate 70. The slide 76 carries two triggers 82, one only shown, which are maintained in their raised positions by the action of a spring 83. These triggers have for their object to maintain in the requisite position an end plate 84 carried by two rods 85 passing through holes 86 formed in the vertical part of the slide 76. These rods have enlarged portions 87 in which are cut notches 88 to receive detents 89. The plate 84 is constantly engaged by spiral springs 90 surrounding the rods 85 and contained between the vertical part of the slide 76 and the piece 84. A thin plate 191 fixed to the end plate 84 slides under the opening 69. It has for its object to prevent a shuttle from passing through the opening 69 before the slide 76 should be entirely pushed back.

91 (Fig. 14) is the shaft carrying cams and supported on one side by the frame and on the other by a bracket 92 fixed to the frame. It turns freely in these supports, and for ease in regulation it is provided at its free extremity with an adjusting wheel 93. The wheel 93 can be operated by hand so as to adjust the cams 94 and 99, 103 and 110 in their respective positions as regards the length of the path of the lever 98, as well as the triangular cam 140. This wheel can also be used to set the cam shaft 91 in any desired position when starting up the loom.

94 is the cam for oscillating the lever 95 (Fig. 20) the edge of which has an inclined portion 96. This lever turns upon a spindle 97 attached to the frame. Between the spindle 97 and the free extremity of the lever 95 at a suitably chosen point, is pivoted a lever 98, the purpose of which will be hereinafter pointed out.

99 is a star wheel with three teeth of the form shown and rotated in the direction of the arrow 100 (Figs. 16 and 20) by a pawl 101 connected to the lay sword 60 by one of its extremities and shaped at the other end in the appropriate form to engage the teeth of 99. The pawl 101 carries near its free extremity a pin 102 adapted to bear on the inclined edge 96 of the lever 25. The arrangement of the inclined edge 96 is such that when 95 rests upon the cam 94 as in Fig. 20, the pin 102 rides upon said edge and prevents 101 from engaging the star wheel. When, however, the cam 94 is turned away from the position shown in Fig. 20, the lever 95 drops down so that the pawl 101 may engage the star wheel to rotate the cam shaft 91 and this is the case also when the lever 95 is lifted by the link 98, which occurs at the beginning of each cycle of operation and means for doing which will be described more fully.

Figures 6, 13, 21:
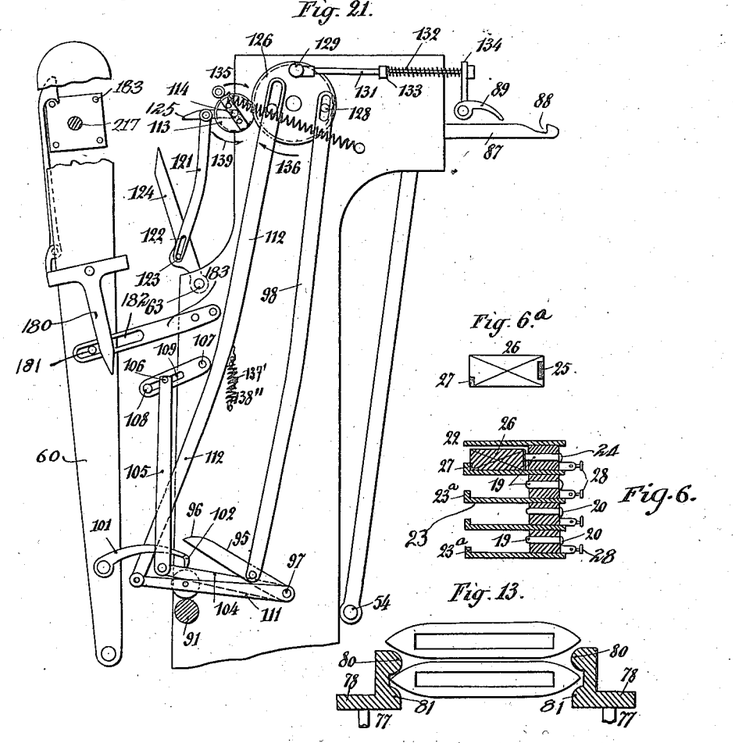
Fig. 6 is a vertical section of this box complete showing the electrical connections.
Figs. 10 to 13 are views of the guides of the shuttle supply magazine, Fig. 10 being a side elevation looking toward the inner face of a guide, Figs. 11 and 12 being sections on the planes 11—11, 12—12, respectively, of Fig. 10, looking toward the left, and Fig. 13 being a cross section on a plane 13—13 of Fig. 10, but showing both guides, and also two shuttles.
Fig. 21 is a side view showing the respective position of the levers which actuate the different members of the changing and distributing mechanism.

103 is a cam of the same form as 94 set at 120° to the latter. It works a lever 104 oscillating about 97 and carrying at its extremity a link 105 to the other extremity of which is suitably connected a lever 106 oscillating around a pin 107 fixed to the frame and carrying at its other extremity a pin 108 whose position can be regulated in a slot 109. This pin is adapted to operate in a known manner the revolving box, by means of pawls and ratchets carried on a system of levers of which one engages with 108. It will be understood that the revolving box is normally held in proper position with respect to the picking mechanism and the batten by means of a spring pressed plate (not shown) carried by the shaft of the box in the manner shown in the patent to Baker *et al*. Serial Number 636,706, of August 22, 1899. Now the system for turning the revolving box, which has just been mentioned, is only partly shown in the drawings but, broadly speaking, is also similar to the system shown in the patent to Baker mentioned above, particular reference being made to Figs. 4 and 6 of said patent. My arrangement (part of which is shown in Fig. 21) consists of a T-shaped lever 180 pivotally mounted on the batten. This lever 180 carries a pawl thereon on one of two horizontal projections extending on both sides of the lay which coöperates with four pins 183 carried on the end of the revolving box to turn the revolving box 90° at each complete operation of the lever 180.

It will be apparent that my arrangement is equivalent to the pawl and pins shown in Baker above mentioned. The operation of the lever 180 in one direction is caused by its striking the pin 108 when the latter has been raised in the manner previously described. This causes the pawl to engage the pins and the reverse swing of the batten causes the lever 180 to strike the pin 181, which is adjustably mounted in the slot 182 of the bar 183 fixed to the frame and projecting toward the batten so as to return the lever 180 and its pawl (not shown) to their normal positions. The revolving box is held normally in proper angular position with respect to the batten by means of four V-shaped teeth formed on the head of the box which is opposite the lever 180. These teeth engage similar teeth on a spring pressed nut 184 which is mounted on the axle 217 so as to move axially thereof but so that it cannot rotate thereon. When the lever 180 has been given one complete oscillation by successive contacts with pins 108 and 181, as just described, the pawl carried on the inner face of the lever coöperates with the pins carried by the box to turn the box 90° or the distance between two successive V-shaped teeth. This said system is adopted on looms at present in use which employ a revolving box, only the position of the pin 108 being modified in the present system according to which it is placed on the lever 106, and is adjustable in the slot 109. During the normal course of weaving the box aforementioned is not revolved. This is only done when replacing a shuttle as hereinafter described.

110 is a cam of the same form as 103. It is set at 120° to the latter and actuates a lever 111 (shown in Fig. 21 but not in Fig. 20) turning about 97 and attached to a link 112.

140 (Fig. 19) is a cam of equilateral triangular formation having rounded edges. A plate 141 is adapted to bear upon either of the plane faces of the cam, said plate being maintained in close contact therewith by a spring 142 so that the spindle 91 should retain the position determined by the rotation of the star wheel.

113 (Figs. 21 and 22) is a toothed sector fixed to the axis or arbor 114 (Figs. 20, 21 and 22) the movement of the sector being rendered rapid by the action of a spring 137 fixed to the frame at 138. This axis 114 further carries a lever 115 (Fig. 22) which is fixed on this axis and, is recessed at $115^a$ to engage with a pin 120 hereinafter mentioned. To 115 is fixed a link 116 which is slotted at 117 to receive a pin 118 fixed on the slides 78.

Figures 10, 11, 12, 14, 15, 16, 17, 18, 19, 20, 22:
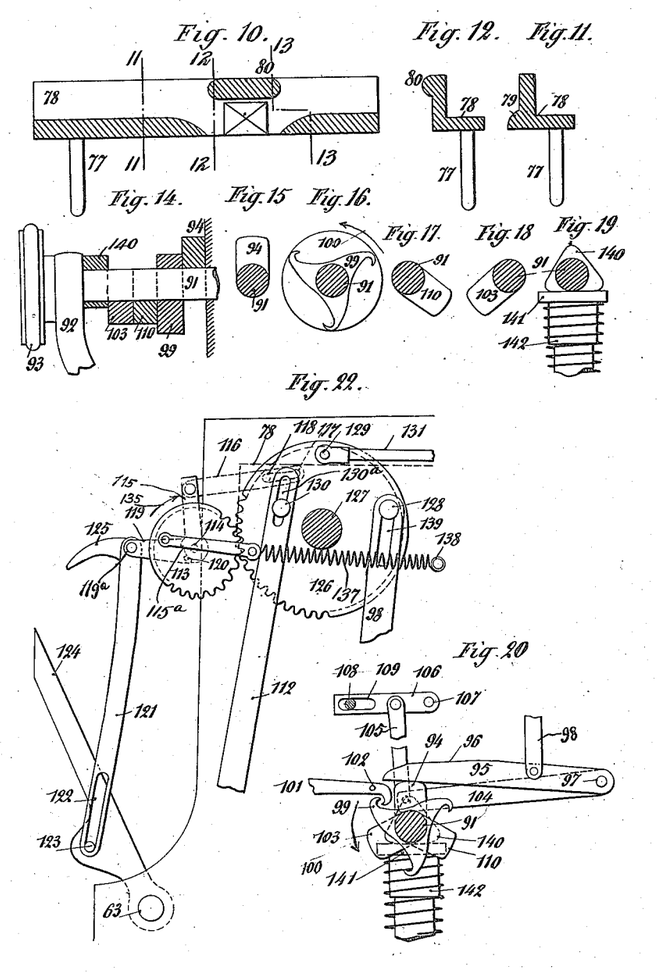
Fig. 14 is a sectional view showing the arrangement of certain cams on their shaft.
Figs. 15, 16, 17, 18 and 19 are views on separate planes of the different cams shown in Fig. 14.
Fig. 20 is a front view of the preceding cams shown in relation with the levers which they actuate.
Fig. 22 is a part view of the preceding on a larger scale showing the members for the ejection of the empty shuttles.

On the spindle 114 by the side of 115, a lever 119 is disposed carrying the pin 120 aforementioned oscillating between the ends of the recess in the lever 115. At the extremity $119^a$ is fixed a link 121 slotted at its other extremity at 122, a pin 123 riding in said slot and being fixed on a catch 124 turning freely on the spindle 63 (Figs. 7 and 22). At $119^a$ is further firmly fixed a member 125 called a "dog" which has for its object to raise the swell of that compartment of the revolving box which is to receive the new shuttle, when the revolving box is rotated.

126 (Fig. 22) is a partially toothed sector turning freely around its spindle 127 fixed on the frame. On this sector are fixed three pivot pins 128, 129 and 130. 128 slides in the slot 139 cut in the head of the lever 98 (Fig. 22).

129 carries a rod 131 (Fig. 22) which brings back the detent 89 (Fig. 9). This rod is surrounded by a spiral spring 132 (Fig. 21) bearing at one end on a ring 133 fixed to the rod 131 and at the other on a lever 134 fixed on the spindle which carries the detents 89. 130 slides in the slot $130^a$ in the head of the lever 112 (Figs. 21 and 22).

Figure 23:
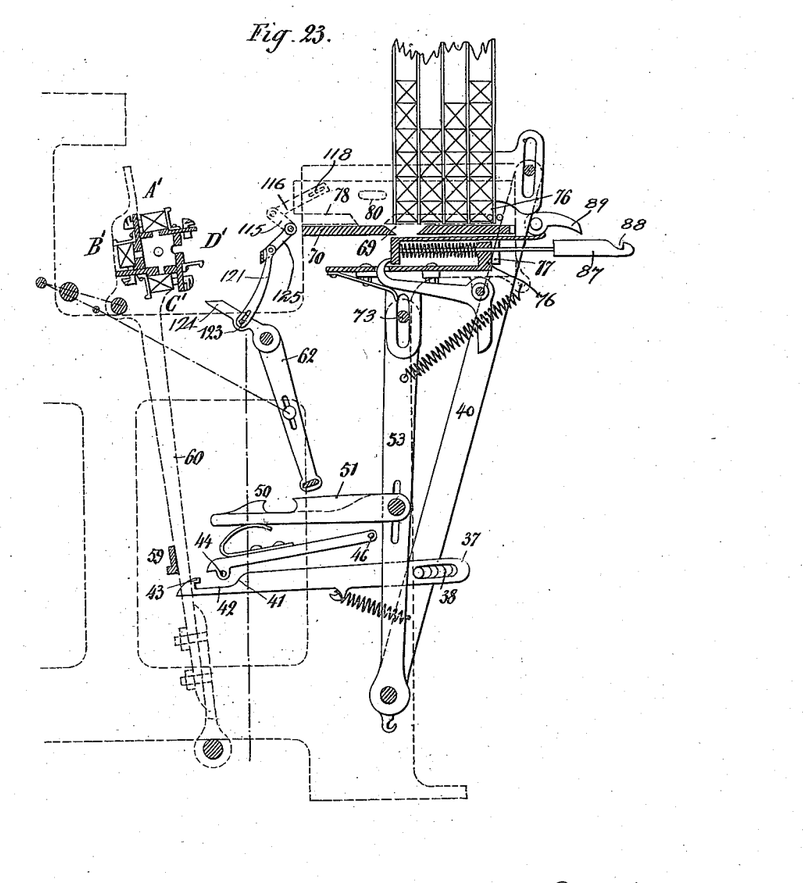
Fig. 23 is a lateral view, partly in section, of the whole of the mechanism for changing the shuttles with the guide and the supply magazine at rest, the loom working in the manner already known.

Before explaining the working of the mechanism as a whole, it would be well, first, to describe further the action of the revolving box. During the normal course of weaving it does not revolve; shuttles picked from their compartments in the rising box are always received in the same compartment of this revolving box and then picked back again; in Fig. 23 this compartment is designated at $A^1$; it will be noticed that the compartment $D^1$ that faces toward the shuttle mechanism is empty. The shuttle in $B^1$ is the one last exhausted before $A^1$, and that in $C^1$ is the one that preceded $B^1$. Suppose now that the shuttle in $A^1$ which is exhausted has been picked for the last time into the revolving box; the following operations will then occur as subsequently described. A new shuttle will be fed to $D^1$, that in $C^1$ will be released and drop down (Fig. 25), and the box will then make a quarter turn in a contra-clockwise direction (Fig. 23) thus presenting again an empty compartment viz. $C^1$, toward the shuttle supply mechanism. In this position the box will remain during the next stretch of normal weaving; at the next change, the shuttle in compartment B¹ will be dropped down, and at the next after the shuttle in compartment A¹ will fall. The shuttle is picked alternately from the rising box to the revolving one and vice versa, each pick occurring when the batten is in the position such as shown by Fig. 23, which I will call the extreme point of its backward movement. To explain the working of the different members I shall suppose that the batten has just passed that point and is moving forward thereby beating the weft while the shuttle has entered into the multiple rising box. In the following description we will suppose that the driving mechanism of the loom is on the left. The members shown in Figs. 2, 3, 4, 5, and 6 are to the right of the loom when looking at it, and the other are to the left. We have supposed a four colored loom to be used, any warp being employed. During the forward movement of the batten above referred to, (which we will call the first) the card on the cylinder 15 is brought against the needles 5, and that needle 5 which is opposite to a hole engages therewith in the usual manner. The levers 1 liberated by the pin 11 of the lever 12, lean upon the top card of the cylinder. A contact is made corresponding to the hole engaged on this card. If the pirn of the shuttle corresponding to this hole is not finished, the circuit not being closed, no current will actuate the corresponding electro-magnet 29. If on the contrary, the pirn corresponding with the hole in the card is almost empty, the current will traverse the shuttle and close the circuit of the corresponding electro-magnet 29; thereupon the lever 30 raises the needle 31 which in its turn raises the arm 37 supported between its loops 34 and 35.

Figure 24:
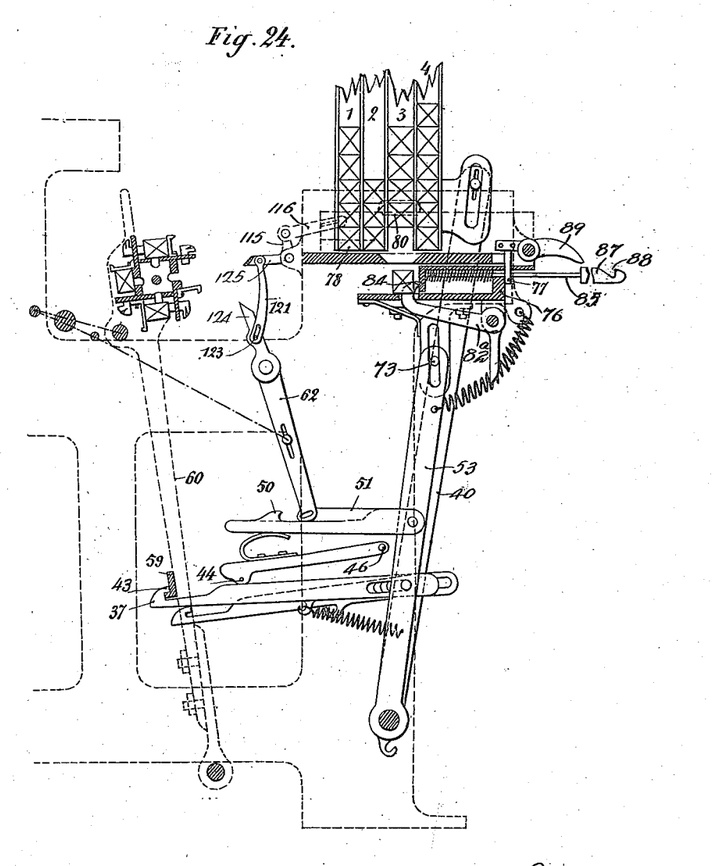
Fig. 24 is a similar view, but with the batten in its backward position, this figure also showing, by way of example, the disposition of the members at the time of the selection of the third shuttle and its fall on the distributer.

In the first backward movement of the batten 60, that is, one in the direction of the arrow 138¹ (Figs. 7, 23, 24 and 25), the angle block 59 fixed on the arm thereof engages the hook. The arm 37 moves in its turn the arm 40 through a distance proportioned to the length of the slot 38. The arm 40 moves that compartment of the magazine corresponding to the colored thread required to its position regulated by the length of the slot 38 and the position of the opening 69. In this same backward movement of the batten, the arm 37 raises, by means of the pin 44 and the lever 45, its spring 49 and the two hooked arms 50 and 51. The arm 51 being engaged by the pin 61 on the arm 62 (Fig. 24) receives a reverse movement from that of the batten and moves the arms 53 and 53' in the direction of the arrow 72 and they engage the slide 76. In its forward movement (for it moves in the reverse direction to the batten), the slide, by means of the pins 77 engages the guides 78. At this moment the shuttle which is over the opening 69 (from 79) is also clear of the ledges 79 and 81 and so falls on the slide 76 in front of the plate 84. The shuttles placed in the same compartment above that which has fallen, are retained by the ledges 80, while those shuttles which are in the magazine compartment in front or behind, ride upon the ledges 79 and 81. In this same forward movement of the slide and the guides, the lever 116 is moved by the pin 118 fixed on one of the guides 78, and itself moves the lever 115 which being connected to the arbor 114 of the sector 113, serves to turn the latter in a clockwise direction (as shown by the arrow 135 in Fig. 22). This sector actuates the dog 125 and the lever 119 which itself by the link 121 and the pin 123 raises the catch 124. In its rotary movement the sector 113 (see Fig. 21) turns the sector 126 which by the pin 128 raises the link 98 which itself raises the lever 95 and removes the edge 96 from the range of movement of 102, thereby allowing the pawl 101 to engage with a tooth of the star wheel. On the said sector 126, is a pin 129, which, by the combination of the rod 131 and the lever 134, raises the detents 89 from engagement with the notches 88 and so releases the rods 86 (Fig. 9) of which 87 are extensions. At this moment the batten is at the extreme point in its first backward movement and the spent shuttle picked for the last time from the rising box to the rotary one.

In the second forward movement of the batten in the direction of arrow 72 to beat up the pick of weft supplied by the shuttle just thrown, the revolving box will be carried forward with it and will present its empty compartment toward the charging slide 76. This slide moves in the reverse direction to that of the batten (that is, in the direction of arrow 138¹) by means of the arm 62 which actuates the blade 50 connected with the arm 53, by this arm and the shaft 54, with the arm 53¹ (Fig. 8); the arm 62 effects this by virtue of the engagement of 61 with the hooked beak on 50, which by its shape, holds on to 61 when in the position shown in Fig. 25. The full shuttle is enabled to enter without resistance into the empty compartment of the revolving box in consequence of the raising of the swell by the dog 125 fixed in front.

Figure 25:
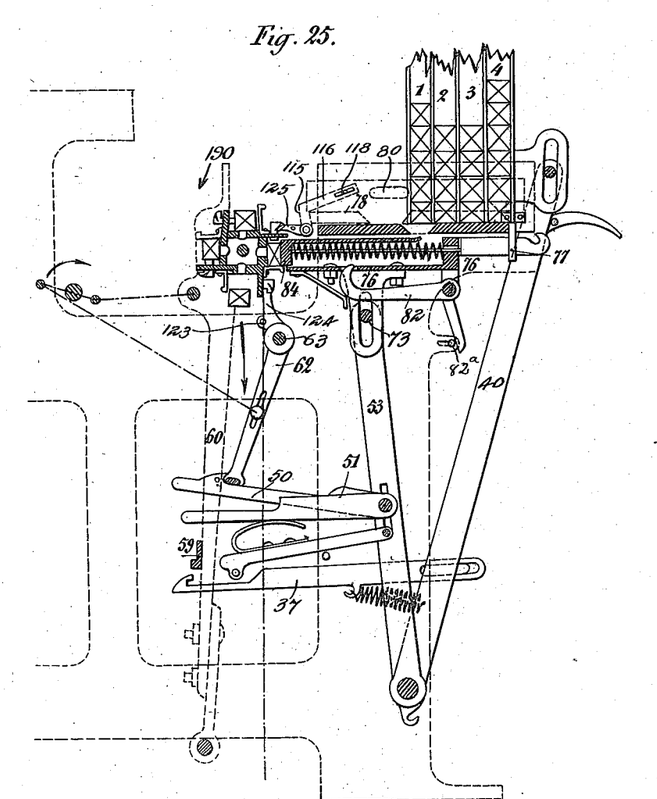
Fig. 25 is also a similar view, but with the batten in its forward position during which it meets the distributer which moves in an opposite direction and so approaches it; the third shuttle being shown placed by the distributer in its compartment of the rotary box.
Figure 26:
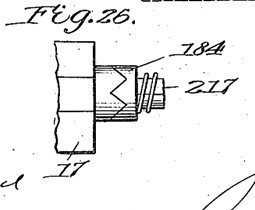
Fig. 26 is detail view showing the means for holding the revolving box in proper position for receiving the shuttle being employed in the weaving.

The insertion of the new full shuttle in the empty compartment of the revolving box effected by the abutment of the vertical part of the trigger 82 against a fixed stop 82ª (see Fig. 25 attached to the frame at such a point that at this moment the batten is at the end of its forward stroke. The horizontal portion of the trigger 82 is lowered, and the plate 84 is shot quickly forward by the expansion of the springs 90. 84 pushes forward the new shuttle which having passed through the opening 69 has fallen on the horizontal part of the slide 76. At the same time, the finger 124, which is also raised, engages under the swell of the lower compartment, raises it, and allows the spent shuttle to fall freely into the basket. In this same position, the batten and pawl 101 liberated by the raising of the lever 95 engages a tooth of the star wheel 99.

In the second rearward movement of the batten, in the direction of the arrow 138¹, the revolving box charged with the new shuttle, frees itself from the dog 125 which allows the swell of this compartment to press against the aforesaid shuttle in the ordinary manner. The pawl 101 turns the star wheel 99 through one third of a revolution in the direction of the arrow 100. In consequence of this rotation the cam 94 is lowered, the cam 110 raises the lever 111, shown in Fig. 21 but not in Fig. 20, which raises in its turn the link 112 which actuates the pin 130 which moves the large sector 126 in the direction of the arrow 136 (Figs. 21 and 22). In this movement the pin 129 pushes the rod 131 which by the lever 134 lowers the detents 89. By this same movement the pin 128 frees the link 98 which allows the lever 95 to drop to such a level that its edge 96 assumes another position in which it cannot prevent the engagement of the pawl 101 and the wheel 99. Lever 95 is lifted subsequently into such a position as to prevent the coöperation between the pawl 101 and the wheel 99 by means of the cam 94 which automatically lifts the lever 95 at a certain point in the revolution of the arbor 91. In its lifting movement the link 112 extends the spring 137 which is connected to sector 113 until the point of connection between the sector 113 and the spring falls below the pivot point of the sector, when the spring serves to give the sector a quick snap to the limit of its free movement in the counter-clockwise direction. A similar snap occurs likewise when the spring passes the center of the sector in the clockwise direction. In its movement opposite to that of the batten, the arm 62 catches the projection on the lever 51, thus moving the arms 53, 53¹ in the direction of the arrow 72 (Fig. 9). The slide 76 thus moves in the same direction and, by reason of its abutment against 87, carries the rods 85 and plate 84 forward with it, and the detents 89 engage in the notches 88. The sector 126 during this same movement of the batten rotates the sector 113 through a quarter of a turn in the direction of the arrow 139 (Fig. 22), the sector 126 being turned in the direction of arrow 136 (Fig. 22) by means of link 112 which is lifted at this juncture by the cam 110 acting through lever 111. By this movement it lowers the arm 119 and by means of the link 121 the finger 124. It also lowers the dog 125 so that the members 124 and 125 are returned to their normal or non-operative positions.

During the third forward movement of the batten (in the direction of the arrow 72) 62 engages 50 and serves to move the slide 76 in the direction of the arrow 138¹. The detent 89, however, engaging in 88, prevents the plate 84 from also moving and consequently the springs 90 are compressed, and the triggers 82 temporarily depressed as they pass under the edge of 84, are forced up again by the spring 83 and bear against the outside of 84. The slide 76 and arms 53 and 53¹ are subsequently returned to the normal position shown in Fig. 23 by the action of the springs 71 and 56. At the end of its third forward movement (in the direction of the arrow 72) the lay sword, by means of the pawl 101 engages the star wheel 99 and turns it through a third of a turn as it moves backward for the third time. By this rotation the cam 110 is put out of action and the cam 103 thrown into action, said cam, by means of the levers 104, 105 and 106, leaves the pin 108 in the position to assist in turning the revolving box through a quarter of a turn during the fourth forward or backward movement of the batten.

In its fourth backward movement, the lay sword turns the star wheel 99 through a third of a turn. It puts out of action the cam 103 and throws into action the cam 94 which lifts the lever 95 into the position in which, as before mentioned, the pin 102 will ride upon the edge 96 thus all the mechanism placed on the left side of the loom is thrown out of action until another pirn should be shown by the selector to be finished.

I claim—

1. In multi-color looms of the type described in combination, a revolving box provided with a plurality of compartments, a rising and falling box provided with the same number of compartments as said revolving box, electrically controlled mechanism for inserting a fresh shuttle into said revolving box, the shuttles for use in both of said boxes having means for closing a circuit upon the exhaustion of the weft and said rising and falling box having means for making electrical contact with said shuttles, a lever for completing the circuit partially closed by an exhausted shuttle, and pattern cards for determining the operation of said rising box and said lever, the cards being arranged to permit the operation of said lever when the batten has at least two more complete to-and-fro movements to make before the spent or exhausted shuttle is picked from the rising and falling box as described.

2. In multi-color looms of the type described in combination, a series of pattern cards, a series of levers one for each color, means for periodically raising and lowering these levers, projections on said levers each adapted to enter those holes in the cards corresponding to a particular color, an indicator on each shuttle to indicate the approaching exhaustion of weft, an intermediate mechanism between the indicators and levers whereby the operation of changing a shuttle is initiated upon simultaneous indication by said indicator and one of said levers, pattern cards for controlling said levers, and a shuttle changing mechanism controlled by said levers, a shuttle selection mechanism provided with needles also bearing on said cards, the levers being so arranged that they bear on a card in the rear of the one presented to the needles of the selecting mechanism, substantially as described.

3. In multi-color looms of the type described in combination, a rising shuttle box with two or more compartments, shuttles with electrical indicating mechanism, and electrical circuits one for each compartment of said box, electro-magnets in said circuits, a revolving member carrying pattern cards, card-engaging levers, connections with the card-engaging levers whereby any one of said circuits can be closed when a portion of the corresponding lever enters a hole in a card, a mechanism actuated by one or the other of said electro-magnets and adapted to replace the exhausted shuttle by a full one having weft of the requisite color, and means for moving said rising box controlled by said pattern cards, the whole substantially as described.

4. In multi-color looms of the type described in combination, a shuttle supply magazine with full shuttles arranged in vertical files, each file containing shuttles of one color, together with means for sliding said magazine horizontally until one or the other of said files is superposed over an opening through which a shuttle can be dropped, said means comprising an arm, a series of differently slotted arms engaging therewith, electro-magnets, means controlled by the electro-magnets for throwing one or the other of these arms into engagement with the batten, and thereby causing the magazine to move through a distance which varies according to the slotted arm that is engaged.

5. In multi-color looms of the type described in combination, a slidable magazine and means for moving it, a fixed platform beneath it with a slot for the passage of a shuttle, a slidable delivery guide with ledges to effect the delivery of one shuttle at a time from the magazine, a charging slide to receive the shuttle delivered from the magazine, a rocking lever to move said slide, pins or other projections for communicating the movement to the guide, and means for moving said lever when required synchronously but oppositely to the batten.

6. In multi-color looms of the type described in combination, a charging slide, a revolving shuttle box on the batten having an empty compartment presented toward the charging slide, a movable shuttle magazine, movable delivery guides coöperating with said magazine, a train of mechanism set in motion by the movement of the delivery guides, and adapted to operate a dog and finger which lift the swells of the empty compartment of the revolving box and of the one behind it respectively, a spring plunger on the charging slide, a detent and trigger for controlling said spring, and means for automatically releasing said spring and causing the plunger to push a full shuttle into the empty compartment of the said box, and for withdrawing the plunger and resetting said spring.

7. In multi-color looms of the type described in combination, a rising and falling shuttle box, a revolving shuttle box, a magazine having shuttles with different colored bobbins, and a mechanism for changing the shuttles comprising a slide, means for moving said slide, a toothed sector connected to said slide, a star wheel, a pawl connected with the batten for moving the same, a lever for causing the engagement or release of said wheel by said pawl, a link connected with said sector for operating said lever, a series of cams mounted to revolve with the star wheel, and mechanism operated by said cams for controlling the engagement or release of said star wheel by said pawl; for moving said toothed sector in a reverse direction to that in which it is moved by the shuttle slides; to initiate the rotation of the revolving box; and to return to their normal positions the parts of the shuttle changing mechanism.

8. In a multi-color loom in combination, a shuttle magazine having compartments for shuttles of various colors, and movably arranged, a movable slide having means whereby one of the shuttles in the magazine may be dropped and the remainder of the shuttles retained in the magazine, and means for arranging said slide and magazine in position to drop a shuttle of the desired color comprising a series of links for operating said magazine having slots of varying lengths corresponding to the separate colors, and selecting mechanism for throwing the desired link into operative connection with the batten.

9. In a multi-color loom in combination, a shuttle magazine having compartments for shuttles of various colors, and movably arranged, a movable slide having means whereby one of the shuttles in the magazine may be dropped and the remainder of the shuttles retained in the magazine, and means for arranging said slide and magazine in position to drop a shuttle of the desired color comprising a series of links for operating said magazine having slots of varying lengths corresponding to the separate colors. and selecting mechanism for throwing the desired link into operative connection with the batten, the selecting slide being provided with ledges against which the ends of the shuttle may rest but having an aperture through which a shuttle may fall and ledges placed above said aperture, said last mentioned ledges being substantially of the same length as the aperture and being placed above the plane of the first mentioned ledges substantially the thickness of one shuttle.

10. In a multi-color loom in combination, a shuttle magazine having compartments for shuttles of various colors, and movably arranged, a movable slide having means whereby one of the shuttles in the magazine may be dropped and the remainder of the shuttles retained in the magazine, and means for arranging said slide and magazine in position to drop a shuttle of the desired color comprising a series of links for operating said magazine having slots of varying lengths corresponding to the separate colors, and selecting mechanism for throwing the desired link into operative connection with the batten, the selecting slide being provided with ledges against which the ends of the shuttle may rest but having an aperture through which a shuttle may fall and ledges placed above said apertures, said last mentioned ledges being substantially of the same length as the apertures and being placed above the plane of the first mentioned ledges substantially the thickness of one shuttle, a plate on which a shuttle may drop from said magazine, and a trigger controlled spring actuated member for pushing the shuttle from said plate into the revolving box.

11. In a multi-color loom in combination, a shuttle magazine having compartments for shuttles of various colors and movably arranged, a movable slide having means whereby one of the shuttles in the magazine may be dropped and the remainder of the shuttles retained in the magazine, and means for arranging said slide and magazine in position to drop a shuttle of the desired color comprising a series of links for operating said magazine having slots of varying lengths corresponding to the separate colors, and selecting mechanism for throwing the desired link into operative connection with the batten, and means for moving said slide in opposition to said magazine.

12. An automatic device for changing the shuttle in a multi-color loom comprising in combination independently working selecting levers one for each color, electro-magnets controlled by said levers, a shuttle magazine having separate compartments for the different colored shuttles, a slide for receiving the full shuttles from said magazine for replacing the working and nearly exhausted shuttle, mechanism for operating said magazine including a series of differently slotted arms adapted to place the corresponding compartment of the magazine above said slide, means for normally holding the shuttles in said magazine and for permitting one of the shuttles only to drop from the selected compartment thereof, said electro-magnet being arranged to control the operation of said mechanism and said mechanism being so arranged that its operation extends over at least two strokes of the batten.

13. An automatic device for changing the shuttles in a multi-color loom comprising in combination traveling pattern cards having perforations therein corresponding to the colors used in the pattern and arranged to advance one card at each complete swing of the batten, a plurality of selecting and control levers resting on one of said cards there being one lever for each color, an exchange box, mechanism for introducing a full shuttle into an empty compartment in said exchange box arranged to operate without interrupting the work of the loom, shuttles having weft exhaustion indicators adapted to close electric circuits upon the exhaustion of the weft, circuits normally open at said indicators and also normally open at another point and electro-magnets in said circuit arranged to initiate the operation of said mechanism when energized, said levers being arranged to close said circuits at said other point whenever they strike a perforation in one of the cards.

14. In a shuttle exchange mechanism, an arrangement for selecting the shuttle for the exchange comprising in combination a magazine having means for keeping separate the shuttles of different colors, a carriage arranged to slide beneath the magazine, said carriage having guiding members for passing between a selected shuttle and the ones of the same color resting upon the selected shuttle, said members thus being adapted to prevent the upper shuttles from following the one selected, and means for moving said magazine and carriage into such position that a shuttle of the desired color is dropped.

JEAN POINTU.

Witnesses:
LAURENT CHABERTZ,
CLARENCE CARRIGAN.